United States Patent [19]
Hatsukano et al.

[11] 3,896,388
[45] July 22, 1975

[54] SYNCHRONIZING SIGNAL GENERATOR DEVICE

[75] Inventors: Yoshikazu Hatsukano; Shunji Shimada, both of Tokyo, Japan

[73] Assignee: Hitachi, Ltd., Japan

[22] Filed: June 13, 1973

[21] Appl. No.: 369,416

[30] Foreign Application Priority Data

June 23, 1972 Japan .................................. 47-6242

[52] U.S. Cl. .................. 328/63; 307/223; 307/269; 328/43

[51] Int. Cl.² .......................................... H03K 1/17

[58] Field of Search ............. 328/41, 42, 43, 45, 46, 328/50, 14, 51, 63; 307/223, 208, 223 C, 269

[56] References Cited

UNITED STATES PATENTS

| | | | |
|---|---|---|---|
| 3,147,442 | 9/1964 | Fritzsche et al. | 328/45 X |
| 3,345,574 | 10/1967 | Hilberg | 328/43 |
| 3,487,166 | 12/1969 | Ryan | 328/63 X |
| 3,548,319 | 12/1970 | Price | 328/42 X |
| 3,555,521 | 1/1971 | Mears | 328/42 X |
| 3,610,954 | 10/1971 | Treadway | 307/218 X |

*Primary Examiner*—John Zazworsky
*Attorney, Agent, or Firm*—Craig & Antonelli

[57] ABSTRACT

A synchronizing signal generator device wherein a frequency divider circuit section is split into a plurality of ring counters. A reference signal having a reference frequency is applied to the first stage of the ring counter. An output signal of each ring counter is fed to the succeeding stage of the ring counter as a synchronizing pulse signal. The frequency-divided signals of predetermined frequencies as derived from the ring counters have substantially no delay over the reference signal.

3 Claims, 4 Drawing Figures

SYNCHRONIZING SIGNAL GENERATOR DEVICE

BACKGROUND OF THE INVENTION

1. Field of the Invention

The present invention relates to a synchronizing signal generator device for producing a signal of predetermined frequency from a reference signal of reference frequency.

2. Description of the Prior Art

In electronic equipment which deals with a compound signal or with two or more signals at the same time, such as a television transmitter, a synchronizing signal generator circuit for synchronization is required. The synchronizing signal generator circuit is generally constructed so as to divide (demultiply) the frequency of a reference signal, or to form another signal from a plurality of signals produced by the frequency division. A frequency divider circuit in such a prior art synchronizing signal generator device is a ripple carry system which is constructed by the multistage connection of a synchronous flip-flop elements.

The conventional frequency divider circuit is disadvantageous in that the quantities of delay at the respective stages of the flip-flops themselves are added, so that the output signal suffers an undesirable phase difference relative to the reference signal. Such a disadvantage is conspicuous especially in a flip-flop chain circuit for the frequency division of a reference signal having a high frequency.

SUMMARY OF THE INVENTION

It is accordingly an object of the present invention to provide a synchronizing signal generator device having a frequency divider circuit section which provides a small amount of delay relative to a reference signal.

Another object of the present invention is to provide a synchronizing signal generator device which can be constructed of the smallest possible number of memory circuit elements.

Still another object of the present invention is to provide a synchronizing signal generator device which is suitable to be manufactured into an ultra-miniature structure by the technique of integrated circuits.

The present invention is characterized by first ring counter means including a first group of synchronous delay type memory circuit elements with their inputs and outputs coupled in cascade, and at least second ring counter means including a second group of synchronous delay type memory circuit elements with their inputs and outputs coupled in cascade, a reference signal being directly or indirectly applied to said first group of synchronous delay type memory circuit elements of said first ring counter means in the form of synchronizing pulses, an output signal of said first ring counter means being applied to said second group of synchronous delay type memory circuit elements of said second ring counter means in the form of synchronizing pulses, whereby a frequency-divided signal having substantially no delay over said reference signal is derived from said second ring counter means.

PREFERRED EMBODIMENTS OF THE INVENTION

The present invention will be described hereunder with reference to the accompanying drawings.

Figure 1:
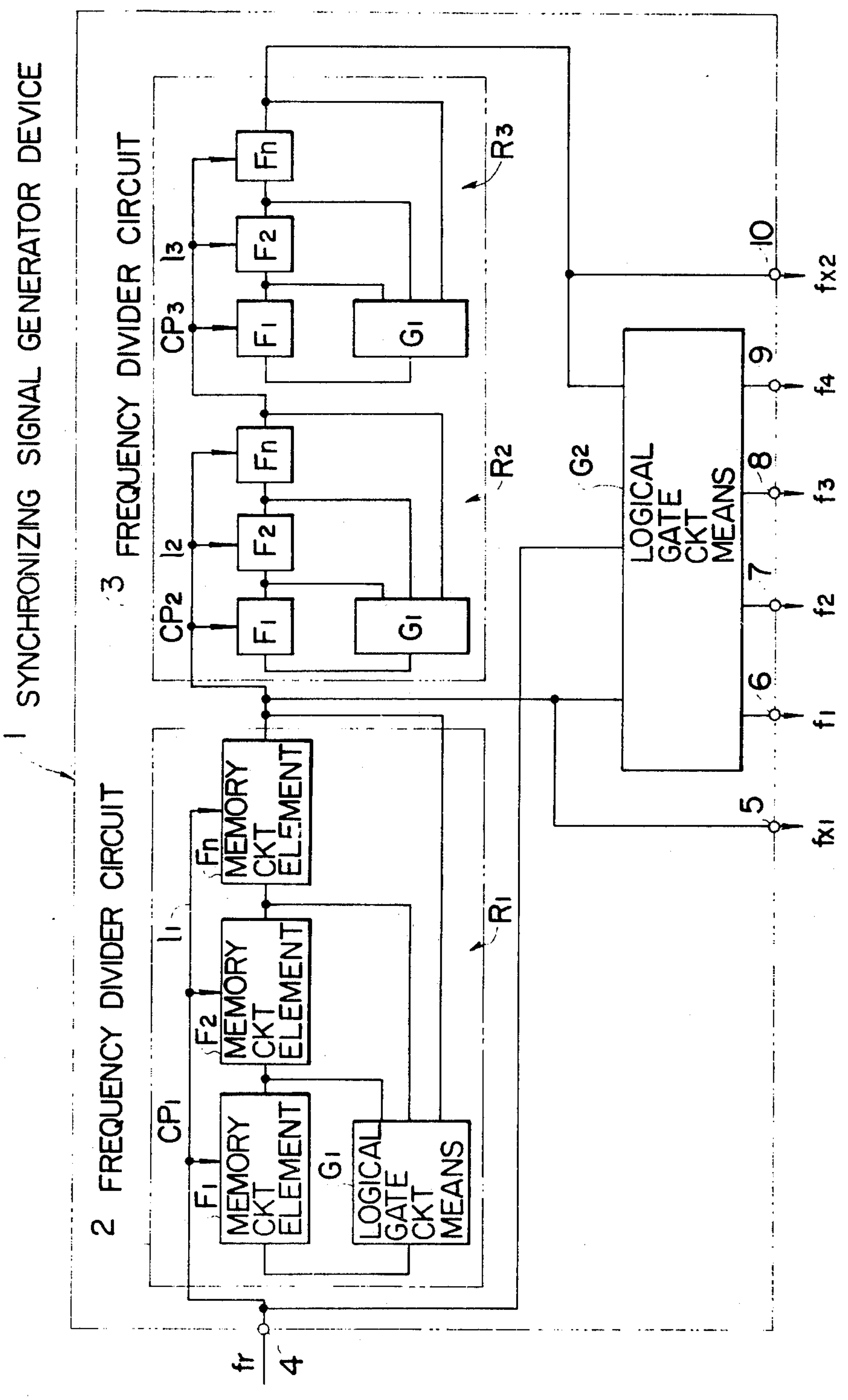
FIG. 1 is a system block diagram showing a synchronizing signal generator device of the present invention.

FIG. 1 shows a synchronizing signal generator device 1 of the present invention. In the figure, numerals 2 and 3 designate frequency divider circuits by which a reference signal $fr$ having a reference frequency as applied to a terminal 4 is subjected to frequency division into two signals $fx_1$ and $fx_2$ (signals obtained at a terminal 5 and a terminal 10) having predetermined frequencies, respectively. The frequency divider circuits 2 and 3 are composed of ring counters $R_1$, $R_2$ and $R_3$, each of which include a group of synchronous delay type memory circuit elements (for example, R – S flip-flops) $F_1 - F_n$. The respective groups of synchronous delay type memory circuit elements are so arrayed that they are driven by synchronizing pulse signals $CP_1 - CP_3$ from synchronizing pulse transmission lines $l_1 - l_3$, and that a transfer signal retained by each delay type memory circuit element is thereby shifted to the succeeding stage of the memory circuit elements.

Each ring counter has a logical gate circuit $G_1$ to which output signals of predetermined ones of the memory circuit elements are applied. Each logical gate circuit $G_1$ is so constructed as to effect in the known manner a predetermined frequency division in the corresponding ring counter, and has its output terminal coupled to the first stage of a memory circuit element $F_1$. A logical gate circuit means $G_2$ receives as inputs the respective outputs of the frequency divider circuits and produces a logic operation which serves to thereby produce the third group of signals $f_1 - f_4$ having pulse widths and pulse frequencies as predetermined. In such a synchronizing signal generator device, the reference signal fr is applied to the terminal 4, the signals $fx_1$ and $fx_2$ brought into the predetermined frequencies owing to the frequency divisions by the frequency divider circuits 2 and 3 are respectively provided from the terminals 5 and 10, and the synchronizing signals $f_1 - f_4$ formed by the logical gate circuit means $G_2$ are respectively provided from terminals 6 – 9.

One of the features of such a synchronizing signal generator device resides in that the output of each ring counter is applied to the next stage as a synchronizing pulse signal. For example, the output signal $fx_1$ of the ring counter $R_1$ is applied to the second ring counter $R_2$ as the synchronizing pulse signal $CP_2$. Further, the output signal of the second ring counter $R_2$ is applied to the third ring counter $R_3$ as the synchronizing pulse $CP_3$. In accordance with the system of the present invention in which the reference signal fr is frequency-divided into the predetermined signals $fx_1$ and $fx_2$ by a plurality of ring counters as stated above, the respective output signals of the ring counters function as the synchronizing pulse signals for the succeeding stages of ring counters, so that the frequency-divided signals ($fx_1$, $fx_2$) having substantially no delay (slip) over the reference signal fr are obtainable. The logical gate circuit means $G_2$ can accordingly receive as inputs the frequency-divided signals free from any delay therebetween, so that the group of synchronizing signals $f_1 - f_4$ of correct pulse width or pulse period are obtainable. Moreover, according to the present invention, the number of the employed memory circuit elements constituting the frequency divider circuit section can be made smaller by splitting the frequency divider circuit section into a plurality of ring counters. As a result, it is possible to provide such a device in the form of an integrated circuit on a single semiconductor substrate.

Figure 2:
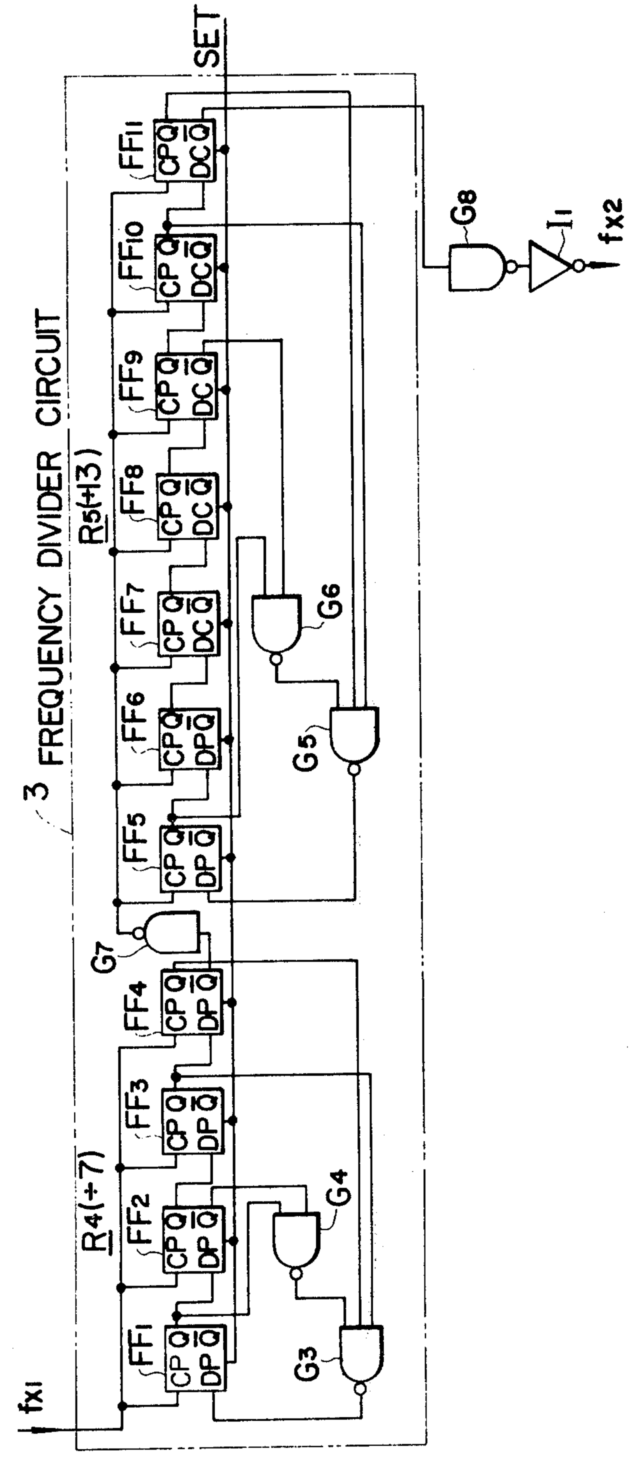
FIG. 2 is a schematic circuit diagram of a portion of the synchronizing signal generator device, showing a practical embodiment of the present invention.

FIG. 2 illustrates a practical embodiment of the present invention. The frequency divider circuit 3 is composed of a ring counter $R_4$ effecting the frequency-division-by-7, and a ring counter $R_5$ effecting the frequency-division-by-13. With the two frequency dividers, therefore, a frequency-divided signal subjected to a frequency-division-by-91 can be produced. The respective ring counters are constructed of delay type flip-flops $FF_1$–$FF_4$ and $FF_5$–$FF_{11}$.

Figure 3:
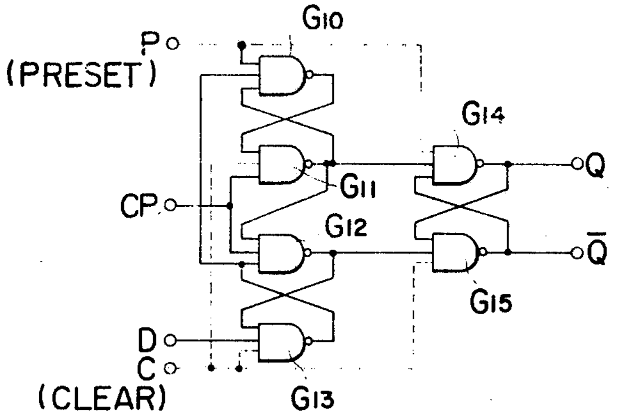
FIG. 3 is a schematic circuit diagram of an example of a synchronous delay type memory circuit element for use in the synchronizing signal generator device of the present invention.

As shown in FIG. 3, each delay type flip-flop is constituted of NAND gates $G_{10}$–$G_{15}$. Further, the feedback circuits of the respective ring counters are constituted of NAND gates $G_3$–$G_4$ and $G_5$–$G_6$. The two ring counters $R_4$ and $R_5$ are coupled by a NAND gate $G_7$. The output of the ring counter $R_5$ is derived through a NAND gate $G_8$ and an inverter $I_1$.

Figure 4:
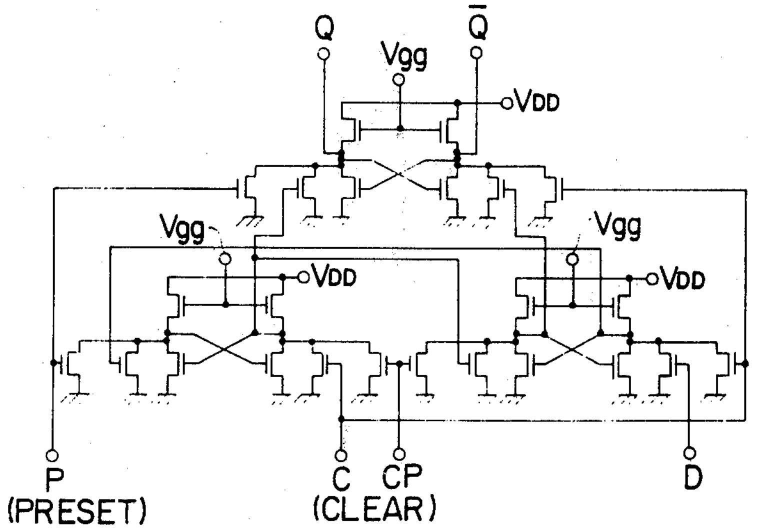
FIG. 4 is a schematic circuit diagram in the case where the memory circuit element shown in FIG. 3 is constructed by the MOSIC (metal-oxide-semiconductor integrated circuit) technique.

With the present embodiment, the delay type flip-flop, illustrated in FIG. 3, was constructed of MOS-FET's (metal-oxide-semiconductor field-effect transistors) as shown in FIG. 4, and the whole synchronizing signal generator device was formed on a single semiconductor substrate by the MOSIC technique. Using the device, a reference signal at a reference frequency of 10 MHz or higher could have the frequency divided to obtain a signal of predetermined frequency with no delay.

As described above, in accordance with the present invention, frequency-divided signals free from any delay can be obtained, and predetermined synchronizing signals can therefore be readily obtained by composing such various frequency-divided signals by logical gate circuit means.

What is claimed is:

1. A synchronizing signal generator device comprising:

at least a first and a second ring counter, each of which includes a plurality of synchronous delay type memory circuit elements each memory circuit element having a clock input terminal for receiving synchronizing pulses and input and output terminals by which said elements are coupled in cascade; and logic gate circuit means having a plurality of input terminals coupled to said output terminals of a plurality of said elements and an output terminal coupled to the input terminal of the first element;

means for applying a reference signal in common to each clock input terminal of said first ring counter in the form of synchronizing pulses; and means for connecting the output terminal of the last element of said first ring counter in common to each clock input terminal of said second ring counter in the form of synchronizing pulses;

whereby a second signal of a predetermined frequency different from the frequency of said reference signal and having substantially no delay over said reference signal is derived from said second ring counter.

2. The synchronizing signal generator device according to claim 1, comprising logical circuit means for forming of said second signal at least a third signal synchronized with said reference signal.

3. The synchronizing signal generator device according to claim 1, further including a third ring counter including a plurality of synchronous delay type memory circuit elements each memory circuit element having clock input terminals for receiving synchronizing pulses and input and output terminals by which said elements are coupled in cascade, and additional logic gate circuit means having a plurality of input terminals coupled to said output terminals of a plurality of said elements and an output terminal coupled to the input terminal of the first element and means for connecting the output terminal of the last element of said second ring counter in common to said each clock input terminal of said third ring counter in the form of synchronizing pulses.

* * * * *